No. 793,349. PATENTED JUNE 27, 1905.
R. CHASSE.
ANIMAL TRAP.
APPLICATION FILED AUG. 24, 1904.
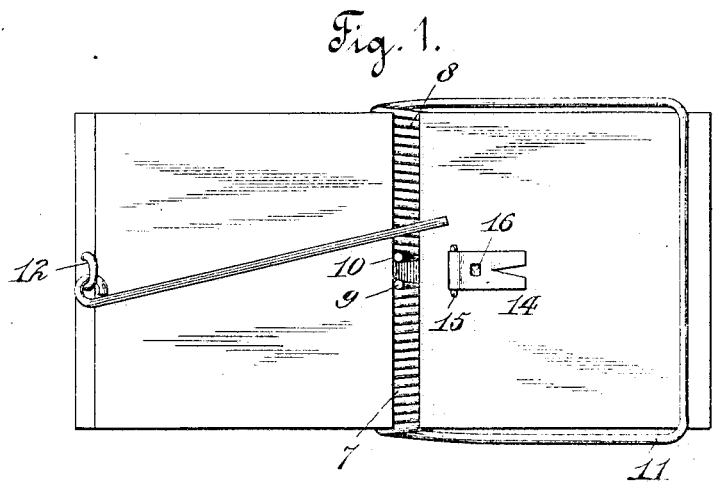
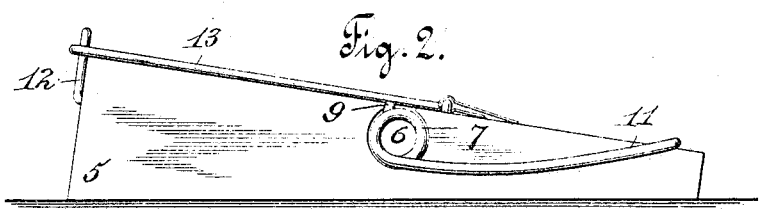
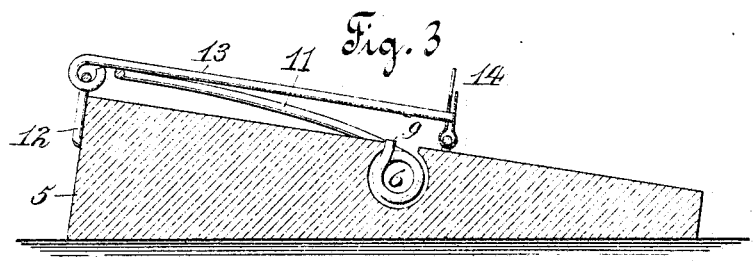
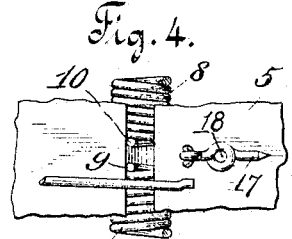
Witnesses
F. N. Roehrich
M. Van Nstwick
Inventor
Raphael Chassé
By his Attorney George Cook No. 793,349. Patented June 27, 1905.

UNITED STATES PATENT OFFICE.

RAPHAEL CHASSÉ, OF NEW YORK, N. Y.

ANIMAL-TRAP.

SPECIFICATION forming part of Letters Patent No. 793,349, dated June 27, 1905.

Application filed August 24, 1904. Serial No. 221,920.

*To all whom it may concern:*

Be it known that I, RAPHAEL CHASSÉ, a citizen of the United States, and a resident of New York, borough of Manhattan, in the county of New York and State of New York, have made and invented certain new and useful Improvements in Animal-Traps, of which the following is a specification.

My invention relates to an improvement in animal-traps, the object being to simplify the construction of those now in general use and at the same time render it effective and certain in its operations.

With these and other ends in view the invention consists in certain novel features of construction and combinations of parts, as will be hereinafter fully described, and pointed out in the claim.

In the accompanying drawings, Figure 1 is a top plan view of my improved trap. Fig. 2 is a view thereof in side elevation. Fig. 3 is a sectional view thereof in its "set" adjustment. Fig. 4 shows a modified form of the catch.

Referring to the drawings, 5 represents a base of any desired size and preferably constructed of wood, although, if desired, the same may be made or formed of metal and beveled or tapered from the rear toward the front end or edge. In this base 5 is formed a circular recess or opening 6, extending from one side of the base to the other and through the upper surface or side of said base, into which is received and retained the spring-coils 7 8, formed from a single piece of wire, the two extreme ends 9 10 of the wire extending upwardly through the opening in the top of the base and against the edge thereof, said wire beyond the coils forming a loop 11, the tension of the spring-coils being such as to hold the loop 11 down against the forward end of the base, as shown in Figs. 1 and 2.

To the rear end of the base is secured the staple 12, with which is attached one end of the rod 13, the latter being of sufficient length when the trap is set to have its free end engage with the catch 14, as illustrated in Fig. 3.

This catch 14 is secured to the base 5 forward of the circular opening 6 and consists of a metal plate bent around the staple 15 and preferably pointed or bifurcated in order to hold and retain the bait. In the front leaf of the bent plate 14 is formed an opening 16, into which the free end of the rod 13 is inserted when the trap is set.

In order to set the trap, the loop 11 is forced backwardly onto the rear portion of the base 5, the rod 13 placed over it, and the free end of said rod inserted into the opening 16 of the catch 14, the latter being lifted or raised to a vertical position, as illustrated in Fig. 3, the tension of the spring against the rod 13 retaining said rod in engagement with said catch. The bait is then placed on the pointed end or ends of the catch 14.

Should an attempt be made to extract or pull the bait from the catch, it results in disengaging the end of the rod 13 from the catch, thereby allowing the tension of the spring-coil 7 8 to throw the loop 11 back into its normal position and to catch and hold the animal between the same and the forward end of the base 5, it being understood, of course, that the wire from which the coils and loop are made may be of a size to impart any desired tension or strength thereto.

Instead of forming the catch 14 from a bent or folded plate, as described, it may be constructed of a piece of wire 17, as illustrated in Fig. 4, in the length of which will be formed a loop 18, into which the end of the rod may be inserted in the same manner and for the same purpose as in the case of the opening 16 in the catch 14.

Having fully described my invention, what I claim as new, and desire to secure by Letters Patent, is—

In an animal-trap, the combination with a base provided with a lateral circular groove or opening extending through the same and through the upper surface of said base, forming a slot or recess, of a loop having coiled spring ends contained within said circular groove, the extreme ends fitting against the edge of said recess, a wire rod pivoted at one end to the rear end of said base, and a catch pivoted to said base forward of said lateral opening and adapted to engage with the free end of said rod when the trap is set, substantially as described.

Signed at New York, borough of Manhattan, in the county of New York and State of New York, this 19th day of August, A. D. 1904.

RAPHAEL CHASSÉ.

Witnesses:
 GEORGE COOK,
 M. VAN NORTWICK.